United States Patent
Falk et al.

(10) Patent No.: US 9,267,551 B2
(45) Date of Patent: Feb. 23, 2016

(54) SAFETY COUPLING (75) Inventors: Curt Gunnar Falk, Hudiksvall (SE);
Mikael Jacobs, Hudiksvall (SE)

(73) Assignee: Voith Turbo Safeset AB (SE)

( * ) Notice: Subject to any disclaimer, the term of this patent is extended or adjusted under 35 U.S.C. 154(b) by 0 days.

(21) Appl. No.: 14/128,491

(22) PCT Filed: Jun. 27, 2012

(86) PCT No.: PCT/SE2012/050726
§ 371 (c)(1),
(2), (4) Date: Dec. 20, 2013

(87) PCT Pub. No.: WO2013/002722
PCT Pub. Date: Jan. 3, 2013

(65) Prior Publication Data
US 2014/0224611 A1 Aug. 14, 2014

(30) Foreign Application Priority Data
Jun. 27, 2011 (SE) ........................................ 1100498

(51) Int. Cl.
*F16D 13/12* (2006.01)
*F16D 1/08* (2006.01)
*F16D 3/02* (2006.01)
*F16D 9/06* (2006.01)
*F16D 43/28* (2006.01)

(52) U.S. Cl.
CPC .............. *F16D 13/12* (2013.01); *F16D 1/0805* (2013.01); *F16D 3/02* (2013.01); *F16D 9/06* (2013.01); *F16D 43/28* (2013.01)

(58) Field of Classification Search
USPC ............................................. 192/56.3, 85.12
See application file for complete search history.

(56) References Cited

U.S. PATENT DOCUMENTS

| 3,532,199 | A |   | 10/1970 | Kraus |
|---|---|---|---|---|
| 4,264,229 | A | * | 4/1981 | Falk et al. ................... 403/5 |

(Continued)

FOREIGN PATENT DOCUMENTS

| DE | 14 50 120 A1 | 2/1969 |
|---|---|---|
| DE | 40 28 158 A1 | 3/1991 |
| DE | 94 06 199 U1 | 6/1994 |

(Continued)

OTHER PUBLICATIONS

International Search Report and Written Opinion for PCT Application No. PCT/SE2012/050726, mailed Oct. 31, 2012, 10 pages.

*Primary Examiner* — Rodney H Bonck
(74) *Attorney, Agent, or Firm* — Foley & Lardner LLP (57) ABSTRACT

The present invention comprises a safety mechanism (2, 3, 3a, 3b), which is related to and/or integrally formed with a safety coupling (1), wherein the safety coupling, with a related safety mechanism (3a) actuatable toward and into an initial active retaining position or toward and into a final inactive releasing position, is adapted, upon rotary motion, to allow for the transmission of torque between a first, driving coupling member (10) and a second, driven coupling member (20) and wherein said actuatable safety mechanism is adapted to be actuatable in a displacement from an initial active position, via a number of intermediate positions, to a final inactive position. The invention provides for the existence of a guided safety mechanism allocated to the safety coupling with means (40, 45), adapted, during a final operating cycle of the safety coupling, to allow the safety mechanism to be displaced in a direction toward and into the initial active position, and from there to again allow a limiting relative movement between the first and the second coupling members, during each subsequent operative cycle.

16 Claims, 4 Drawing Sheets (56) References Cited

U.S. PATENT DOCUMENTS 4,923,320 A * 5/1990 Klischat .......................... 403/5
2009/0173591 A1 * 7/2009 Ootsuka et al. ............ 192/56.31

FOREIGN PATENT DOCUMENTS

| GB | 2 023 250 A | 12/1979 |
| WO | WO-2008/079075 A1 | 7/2008 |

* cited by examiner

SAFETY COUPLING

CROSS-REFERENCE TO RELATED PATENT APPLICATIONS

This application claims the benefit of International Application No. PCT/SE2012/050726, filed Jun. 27, 2012, which claims the benefit of Swedish Application No. 1100498-3, filed Jun. 27, 2011, both of which are incorporated herein by reference in their entirety.

TECHNICAL FIELD OF THE INVENTION

The present invention relates generally to a safety coupling. In the following description, the term "safety coupling" means a coordination between;
 a. a safety arrangement coordinated or integrated with a coupling unit.
 b. a safety arrangement for a safety mechanism which can be actuated to an "active" or "inactive" position, the safety mechanism being integrally formed with or forming a separate unit from the safety arrangement, and
 c. a torque-transmitting coupling unit with one driving coupling member and one driven coupling member and equipped with overload protection in the form of the safety arrangement described in "b".

A safety arrangement with an overload protector is adapted to take the coupling unit from an "active" position ("on" mode) to an "inactive" position ("off" mode) as soon as the transmitted torque exceeds a predetermined value and wherein the torque-transmitting coupling unit is adapted, via the influence of a means and/or the safety arrangement, to make the coupling or coupling unit, upon transmission of torque, immediately switch over from an "active" position to an "inactive" position.

Thus, the safety arrangement can assume an "active" position in order to retain the coupling unit in an "active" position, as long as the torque is below a predetermined maximized value, while the safety arrangement assumes an "inactive" or inactivating position in order to bring the coupling to an "inactive" position as soon as torque exceeds a predetermined maximized value.

As a proposed embodiment, the friction coupling or friction coupling unit will, once the predetermined value has been exceeded, create a relative movement between a first, driving coupling member and a second, driven coupling member and a friction surface located between the two.

Such a friction surface can then be formed as one or more opposing, coaxially arranged cylinder surfaces, one or more coaxially related flat or tapered circular or conical friction surfaces and the like.

The invention will, as follows and as a proposed embodiment, be illustrated as a safety coupling with cylindrical friction surfaces, related to the torque-transmitting coupling unit.

The invention aims primarily to obtaining an application for a safety coupling, with a related "on"/"off" coupling unit toward and into an initial "active" (retaining) position or toward and into a final "inactive" (releasing) position, and with a safety arrangement coordinated with a safety mechanism that can be actuated and adjusted to various positions.

Safety couplings of the relevant type are thus adapted to, via rotary motion, allow for the transmission of torque, such as time-varying torque, between a first, driving coupling member and a second, driven coupling member forming part of the selected friction coupling or friction coupling unit.

Furthermore, the present invention requires for its operation, according to an aspect of the present invention, that the afore-mentioned actuatable safety mechanism be adapted such that when a preselected torque and a maximized relative movement caused by this high torque between the first and the second coupling members are exceeded, the safety mechanism is actuated in a relative displacement from an initial "active" position toward and into an "inactive" position for the coupling unit's coupling members.

Said safety arrangement must thus be adapted to permit a limited yet maximized relative movement between the first and the second coupling members within the friction coupling, this limited relative movement being adapted to correspond to a selected arc angle and/or a selected arcuate distance, between its initial "active" position and its final "inactive" position, where the safety arrangement is adapted to instantaneously allow the coupling unit actuate to its "inactive" position and thereby instantaneously allow the transmission of excessive torque via the coupling unit, by momentarily exposing the friction surfaces forming part of and opposing the coupling.

The present invention relates to an application for large rock drills, intended to allow for the drilling of holes in rock, such as for vehicular and/or rail traffic and/or tunnels and/or for other purposes, and where such drills are allocated a number of coordinated drill stations, distributed along the circumference of a circular cutter head.

These drills with their circumferential drill stations are designed to drill into rock during successive operating cycles, each cycle being associated with a beginning and an end, with a first operating cycle being terminated and later replaced by a second subsequent operating cycle, and so on.

The present invention intends to, via the safety arrangement and its interaction with the coupling unit and the safety mechanism, rapidly trigger the coupling unit to assume an "inactive" position at a high and relatively sustained torque, creating a maximized relative movement between the coupling members, but intends to accept high yet extremely short, so-called torque peaks occurring during a single operating cycle, without therefore allowing for the activation of the coupling unit trigger to its "inactive mode".

TECHNICAL BACKGROUND OF INVENTION

The methods, arrangements and structures related to the above technical area and with a function and a character which meets the set requirements are previously known in various embodiments.

As an example of the background art and the technical area to which the invention pertains, one safety arrangement may be mentioned, being related to or integrally formed with a safety coupling, and coordinating with a safety mechanism, as disclosed in DE 40 28 158.

The safety coupling is actuatable by an adapted safety arrangement toward and into an initial active (retaining) position, or toward and into an inactive (releasing) position, with a connection to the above-described "on"/"off" function.

These torque transmission coupling units are adapted to, via rotary motion, allow for the transmission of (high) torque between a first, driving coupling member and a second, driven coupling member.

Said safety arrangement is adapted to, when a preselected torque and a relative motion caused by this high torque between the first and second coupling members are exceeded, be actuated, via a safety mechanism, in a displacement from its initial active position to its final inactive position, said safety arrangement being adapted to permit a limited relative movement between the first and the second coupling members corresponding to a selected maximized arcuate distance between its initial active position and its final inactive position, the safety arrangement being adapted to mechanically permit the coupling unit to be actuated to its inactive position by momentarily evacuating a cavity, filled with a medium under high pressure, of its contents (aqueous emulsion, oil).

It should be noted that a relative movement caused between the two coupling members over a friction surface located between the two coupling members can produce very high friction-related effects related to the prevailing frictional force and the length and width of the arcuate distance utilized for this purpose.

The known safety coupling, with its allocated safety mechanism, is constructed such that a limited relative movement between the coupling members, caused primarily by short-term torque peaks exceeding a predetermined maximized torque value, will be progressively utilized and added to each and every successive work cycle, until the chosen maximum arcuate distance is fully utilized and the final inactive position of the arrangement can be achieved with an extremely small final relative movement, less than the maximum arcuate distance, during one operating cycle.

The known safety coupling offers no visual inspection of, or easily ascertainable way of determining, the relative movement achieved between the coupling members at the start of each operating cycle.

When a safety coupling of the relevant kind has been triggered and assumed its final inactive (release) position, extensive measures are required to permit the safety coupling to re-activate, such that once a coupling unit has been triggered, such as in the form of a cut and opened valve assembly, a valve assembly must be replaced and a cavity in the safety coupling must be re-pressurized with an aqueous emulsion or oil via a replacement valve assembly.

These measures have proven to be extremely burdensome, especially in a situation where the safety coupling thus triggered, related to a drilling station, is located in an inaccessible place and position, such as high above a ground plane.

Therefore there is a need to develop improved safety couplings which solve the above problems.

SUMMARY

The aim of the present invention is to provide an improved safety coupling which solves the above problems by resetting and utilizing the maximum arcuate distance for each operating cycle.

This is achieved with a safety coupling according to claim 1, with an associated safety mechanism and a related safety arrangement, related to and/or integrally formed with each other, comprising a coupling unit adapted to, upon rotary motion, allow for the transmission of torque between two coaxially oriented coupling members, one driving, inner coupling member and one driven, external coupling member, with a cylindrical and/or circular and/or cone-shaped friction surface oriented between the inner coupling member and the outer coupling member, wherein the inner coupling member, being integrated into the coupling member, comprises a cylindrical or conically oriented cavity integrated into the coupling member and facing towards the frictional surface, which upon pressure applied by a medium (an aqueous emulsion or a oil pressure) is adapted to expand in the direction of the friction surface, wherein the safety coupling has the associated safety arrangement which is actuatable toward and into an initial actively retaining position, wherein the cavity is in an expanded position, or toward and into an inactive releasing position, wherein said cavity is in a non-expanded position, of the coupling unit, wherein the actuatable safety arrangement is adapted, when a preselected torque and a relative movement caused by this torque between the first and second coupling members are exceeded, to be actuated by the safety mechanism in a displacement from the initial active position toward and into the inactive position by evacuating the when exceeding pressure from the cavity, wherein said safety arrangement is thereby adapted to allow a limited relative movement between the first and the second coupling part, corresponding to a selected maximized arcuate distance between its initial active position and its final inactive position, and wherein the safety arrangement is adapted to momentarily allow the coupling unit to be actuated to its inactive position. The means allocated to the safety arrangement and/or the safety mechanism is adapted to, during a final operating cycle of the safety coupling, permit the safety mechanism to be restored/displaced in a direction toward and into the initial active position, in order to from this active position permit the provision of a limited relative movement between the first and the second coupling member in a subsequent operating cycle, and not successively permit the loading and reduction of the available arcuate distance with relative displacements between the coupling members arising from one or more preceding operating cycles.

In a preferred embodiment, the initial position is chosen to fall within a maximized arc range where the safety mechanism can be displaced between the initially active position and the final inactive position and in opposite directions from an initial active starting position, depending on the chosen direction of rotation of the two coupling members.

In another embodiment, the limited relative movement between the first and second coupling members of the coupling is selected so as to always be below a few rotations, for example a single rotation, or a fraction of a rotation, for example a quarter rotation.

In a preferred embodiment, relative movement caused between the coupling members beyond a selected, predetermined movement pattern brings the coupling members to an inactive position.

In an alternative embodiment, the cavity interacts with a valve unit adapted to be opened instantaneously.

In another embodiment, the valve assembly is adapted to be opened by means of a cutting operation, activated by the rotation of an adjacent disc.

In an alternative embodiment, the means comprises a first disc or carrier disc which is formed along one side with one or more circumferential grooves or ridges, connecting to form a circle line, the length of the groove or arcuate distance between the ridges being adapted to correspond to the selected maximized arcuate distance between an active position and an inactive position of the coupling unit and wherein a stop means is adapted to engage with grooves or ridges to trigger the safety arrangement.

In a preferred embodiment the disc comprises along its second side, which is directed away from the first side, a number of inner notches facing the center, and a number of outer notches facing the periphery.

In another embodiment, the second side is allocated notches which are adapted to interact with one or more units, having projections, arranged to allow radial motion via a centrifugal device operating on centrifugal forces.

In an alternative embodiment, the centrifugal device is adapted to, at a low rotation speed, engage with said inner notch, and at a high rotation speed, to engage with said outer notch.

In another preferred embodiment, the disc's inner notches and outer notches are adapted to open towards an intermediate, substantially circular groove, and when said units and/or projections assume a radial position corresponding to the position of the intermediate groove, the safety arrangement returns to the initial active position of the coupling unit.

In an alternative embodiment, the disc's inner and outer notches are tangentially displaced one half-step in relation to one another, in order to ensure that there is no rotation speed when the safety mechanism is not triggered in the event that the projection assumes a radial position corresponding to the position of the intermediate groove.

In a preferred embodiment, the centrifugal device features units movable by rotary motion in a radial manner from one another, with allocated projections and is guided in its movement by radial grooves engageable with radial tracks on a disc or hub plate.

In another embodiment, the devices of the first and second spring units are pressed into their inner starting positions at a low or at no rotary motion. In an alternative embodiment, the projections on the movably arranged units are engageable only with the carrier plate in order to engage said stop means, which is adapted through forced rotation to open said valve assembly and to bring the coupling members to an inactive releasing position.

BRIEF DESCRIPTION OF THE DRAWINGS

The prior art and a presently proposed embodiment, having the significant characteristics associated with the present invention, will now for purposes of exemplification be described in more detail with reference to the accompanying drawing, where.

DESCRIPTION OF PRIOR ART AND THE PRESENT PROPOSED EMBODIMENT

It must first be observed that in the subsequent description of a currently proposed embodiment, which shows the significant characteristics associated with the invention and which will clarified by the figures shown in the following drawings, we have allowed for the selection of terms and specific terminology with the primary purpose of clarifying the invention idea.

However, it should be noted in this context that the expressions chosen here should not be seen as limiting only to the terms selected and utilized herein; but rather it is understood that each term so selected shall be construed to also include all technical equivalents which operate in the same or substantially the same manner, in order to thereby achieve the same or substantially the same intention and/or technical effect.

With reference to the accompanying FIGS. 1 to 14, not only the principles known in the art, but also for the present invention, are presented schematically and in detail, whereby the significant characteristics associated with the invention are substantiated by the currently proposed embodiment which is subsequently described in greater detail.

Figure 1:
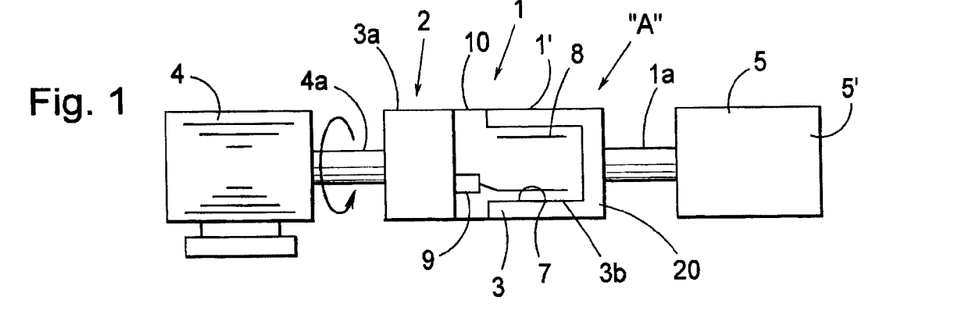
FIG. 1 shows a known device where a safety coupling is related to a torque-transmitting coupling unit, having a driving unit and a driven unit coordinated with a steerable safety arrangement which is allocated a coupling unit and a steerable safety mechanism which is coordinated with a safety arrangement.

Thus, FIG. 1 shows a format, linked and integrated as a single unit 2 to a safety coupling 1 with a safety arrangement 3b and/or a safety arrangement 3 related to and/or integrally formed with the guided and guiding safety arrangement 3b, wherein the safety coupling 1, with the associated safety mechanism 3a, which is actuatable toward and into an initial "active" (retaining) position or toward and into an "inactive" (releasing) position of coupling unit 3, is adapted to, upon rotary motion, allow the transmission of torque between a first, driving coupling member 10 and a second, driven coupling member 20 and wherein said actuatable safety arrangement 3b and/or safety mechanism 3a is adapted to, when a preselected high torque and a maximized relative movement caused by this high torque between the first 10 and second 20 coupling member are exceeded, be actuated in a displacement from an initial active position and intermediate position to a final inactive position of the coupling unit 3 and the coupling members 10, 20.

Said guided safety arrangement 3b is thus adapted to allow a limited relative movement and distance of travel within a maximized arcuate distance between the first 10 and the second 20 coupling member to a selected arcuate distance between its initial active position and its final inactive position, where the safety mechanism 3a is 10 adapted to, after traveling such a distance, allow the coupling unit 3 and its coupling members 10, 20 to actuate to their inactive and releasing position.

More particularly, FIG. 1 illustrates a known system "A", in which a motor unit 4 is adapted to allow the guided "on"-"off" safety arrangement 3b to be driven over a driving shaft 4a, via safety arrangement 3b, which are coordinated and integrated with one another.

The coupling unit 3 which, in turn, via an output shaft 1a, cooperates with a unit 5 driving a drill unit 5' or the equivalent, via a rotary motion and torque transmission.

The present invention is based on a known safety coupling 1 which comprises:
  a. a safety arrangement 3b forming an integral part of the coupling unit 3,
  b. this safety arrangement 3b is to be coordinated with a safety mechanism 3a, shown in FIG. 1, integrally coordinated with each other; and
  c. a torque-transmitting coupling unit in a form such as safety coupling 1, such as a friction coupling 1' as illustrated here.

Safety coupling 1 has a related safety arrangement 3b, actuatable toward and into an initial active (retaining) position or toward and into an inactive (releasing) position of the coupling members 10, 20, where the friction coupling 1' is adapted to, upon rotary motion, allow the transmission of torque between a first, driving input coupling member 10 coupling member 10 and a second, driven output coupling member 20.

Said actuatable safety arrangement 3b is adapted to, when a preselected torque and a relative movement caused by this torque between the first 10 and the second 10 coupling member are exceeded, be actuated by a safety mechanism 3a coordinated therewith, adapted for a permissible displacement from the initial active position to the inactive position.

Said safety arrangement 3b is thus adapted to allow a limited relative movement (along the path "x3" in FIGS. 7 and 14) between the first 10 and the second 20 coupling member in a chosen maximized arcuate distance (between position "x1" and position "x2") between its initial active position ("x1"), each intermediate position and its final inactive position ("x2"), where the safety mechanism 3a is shown here as mechanically linked with the safety arrangement 3b, which is adapted to instantaneously allow the coupling unit 3 and friction coupling 1' to actuate to their inactive position 11.

The previously indicated safety mechanism 3a is designed so that it allows for the "storage" of even temporary torque peaks exceeding a maximized torque "x2" from a first operating cycle A1 to each successive operating cycle until a per se short peak torque, momentarily exceeding the maximizing torque, for a "final" operating cycle instantaneously triggers the safety arrangement 3b, by creating conditions for a valve assembly 9, connected to the cavity 8, to momentarily open and evacuate the cavity and expose the coupling members 10, of friction coupling 1'' from a collaboration with the friction surface 7, 7'.

The present invention is primarily based on a new design and a new construction of safety mechanism 3a, in order to allow safety mechanism 3a at the end of each operating cycle to return to a starting position and thus indirectly allow safety arrangement 3b to assume an initial position with an available maximized arc distance without regard for the mutual relative displacement of the coupling members.

With reference to FIGS. 2 to 9, a means 6 of triggering safety arrangement 3b allocated to safety coupling 1 and/or safety mechanism 3a, this means 6 being directly allocated to safety mechanism 3a and more fully described in the following, is illustrated as currently proposed embodiment.

This means 6 is adapted, during each final operating cycle (see FIG. 14) for safety coupling 1, to allow the coupling unit's safety mechanism 3a to be displaced in the direction toward and into the initial active position "x1", and from there to allow once again for a predetermined maximized relative motion "x3" between position "x1" and position "x2" to be provided for the first 10 and second coupling member 20, upon each following operating cycle A2, A3.

The initial position "x1" should be selected to fall within a maximized arc range "x3" between the position "x1" and position "x2", where the safety mechanism 3a, in combination with safety arrangement 3b, can be displaced from an initial active position and toward one of two
final inactive positions and in opposite directions from a common initial active starting position, depending on the chosen direction of rotation and the selected distance of travel relative to the two coupling members 10, 20.

Figure 7:
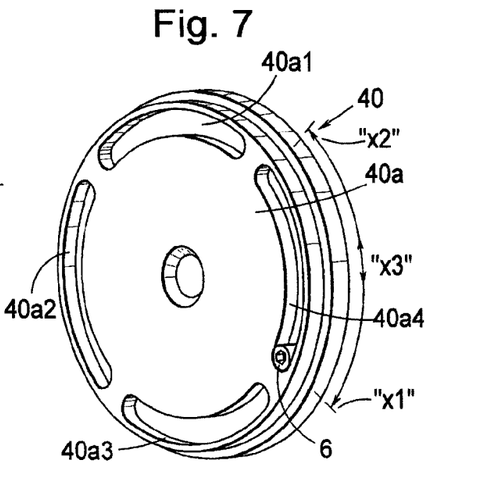
FIG. 7 shows a perspective view of the carrier disc's second circular side with four circumferentially oriented tracks connecting to form one single circular line, each one defining a free distance of travel within a maximized arcuate distance corresponding to a maximized yet limited relative movement between the first and the second coupling unit before the coupling unit is triggered by actuation of the safety arrangement by the safety mechanism and brought to its inactive (release) position.

The limited relative movement "x3" is selected for a selected number of rotations, so as to always be less than one rotation, and in the exemplary embodiment, shown in FIG. 7, the relative movement and distance of travel selected are one quarter turn, one for each stop position "x2".

Figure 3:
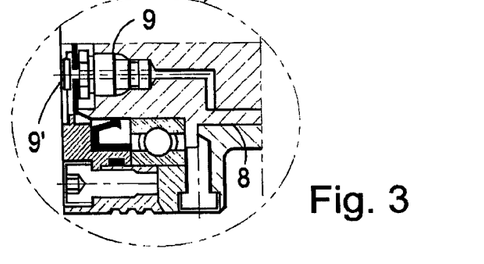
FIG. 3 shows an enlarged view of a coupling unit and a valve assembly belonging to an allocated cavity, which in a sealed position allows for the activation, via an incompressible overpressure, of the coupling's two coupling members such that they assume an initial active (retaining) position, by allowing said pressure to be active within the cavity of the coupling device, but which in an open position deactivates the coupling's two coupling members such that they assume an inactive (releasing) position.

The safety coupling 1 comprises two coaxially oriented coupling members 10, 20 with a cylindrical friction surface 7, 7', located between an inner coupling member 10 and an outer coupling member 20, where the inner coupling member 10 is adapted to have a cylindrical cavity 8 located adjacent to the cylindrical friction surface 7, 7', adapted by the applied pressure of a medium 8' to expand radially against the friction surface 7, 7' and to exert there friction-related pressure, whereby the cavity interacts with a valve assembly 9, according to FIG. 3, and the valve assembly 9 is freely oriented and adapted such that it will be opened, for example cut, by the rotary motion of an adjacent disc 41, inflexibly engaged with the valve assembly 9 in the coupling member 10, in the event of relative movement caused between coupling members 10, 20.

Safety mechanism 3a comprises the following components, described further and in detail below:
- a housing 30 which is adapted to be connected to the outer coupling member 20, for example by bolts or screws to a peripheral flange 31;
- a switch ring 41 formed as a disc with circumferential recesses 42 for receiving a protruding peak 9' of the valve assembly 9, also called a switch pipe;
- a hub plate 60 rigidly connected to switch ring 41 by a groove 60c for receiving a projection 41a on the switch ring 41;
- a drive plate or carrier plate 40 comprising on its one side one 40a one or more circumferential grooves 40a1, 40a2, 40a3 and 40a4, connecting to form a single circular line,
- and on its other side 40b a plurality of circumferentially arranged notches or recesses 40b2, 40b3, forming crested ridges;
- a centrifugal device 50 with a trigger element 50' and a counterweight element 50", arranged in a radially movable manner between the hub plate 60 and drive plate 40, and comprising radial grooves 50b adapted for interaction with radial rails 60a in the hub plate 60, wherein the trigger element 50' also comprises a projection 50a adapted to engage in the recesses 40b2, 40b3 of the drive plate 40;
- and a cover plate or lid 70 which via a return spring 45 and a bracket 46 is connected with the drive plate 40, and also comprises a trigger means 6 in the form of a stop screw or bolt 6 adapted to engage the grooves 40a1, 40a2, 40a3 and 40a4 in the first side 40a of the disc 40.

The housing 30 surrounds the hub plate 60, trigger element 50, counterbalance element 50" and drive plate 40 which are coaxially arranged within the inner space of the housing, which is bounded at one end by a wall 32 and at the other end by the cover plate 70 which is inflexibly connected to the housing 30 by means of peripheral screws or bolts. Switch ring 41 is inflexibly connected to the hub plate 60 on the outside of the wall 32 of the housing 30 by a screw or bolt, whereby projection 41a and groove 60c engage one another through a centrally located opening in wall 32.

Figure 14:
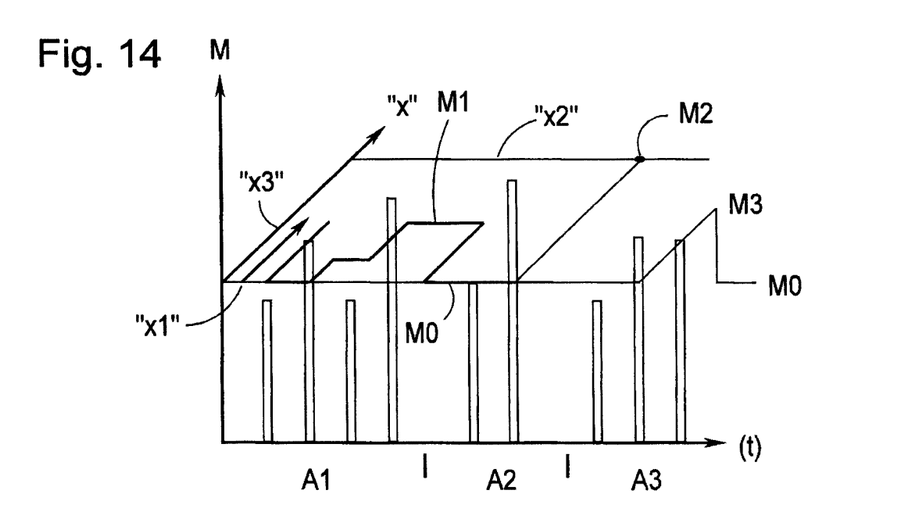
FIG. 14 illustrates the temporal distribution of a hypothetical torque with torque peaks during a first and subsequent operating cycle, wherein the guiding safety mechanism is adapted to allow a limited relative movement between the first and the second coupling member, corresponding to a selected maximized arcuate distance or travel distance between its initial active position and each intermediate position before the final inactivating position.

The drive plate 40, illustrated in FIGS. 2 and 4 to 7, is, along one side 40a, formed with one or more (in this case four), grooves 40a1, 40a2, 40a3 and 40a4 connecting into a single circular line, the maximum arc length or length "x3" of which grooves are adapted to correspond to the selected maximized distance or travel distance labeled "x" in FIG. 14, between an active position "x1", every intermediate position "x3" and an inactive position "x2" for the safety coupling 1 and in which distance "x3" coupling members 10, 20 can assume their engaged position via their activated and opposing friction surfaces 7, 7'.

Figure 6:
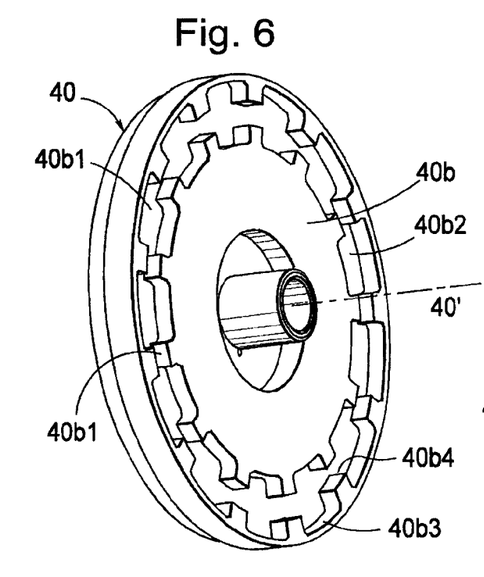
FIG. 6 shows a perspective view of a carrier disc's one circular side, with circumferentially oriented notches or recesses, wherein a first set of notches or recesses is arranged to face away from the center of the disc and a second set of notches or recesses is arranged to face the center of the disc and where these recesses are separated from one another by means of a circular, narrowly formed groove located in between, this groove connecting to the recesses' open and opposing extents.

The drive plate 40 is formed, along its second side 40b, which is directed away from the first side 40a, according to FIG. 6, with a substantially circular circumferential groove 40b1, this groove being formed with a number of inner notches or recesses facing away from the center 40', and outer notches or recesses 40b3 facing the center 40', and that these inner notches or recesses 40b2 and these outer notches or recesses 40b3 are adapted to open towards an intermediate, substantially circular narrow groove 40b4 (corresponding to groove 40b1). The notches or recesses 40b2, 40b3 of the other side 40b, are adapted for engagement with a projection 50a on the trigger element 50', which is arranged in a movable radial manner between the drive plate 40 and hub plate 60. The trigger element 50' (and the counterweight element 50") exhibit a hole 50c in which the spring units 51', 51", and guide means 52', 52" are engaged. The spring assembly 51' exerts an inward-directed radial force on the trigger element 50' to compress it in an inward radial direction. At low rotation speed, the inwardly directed force is greater than the centrifugal force and the trigger element 50' is then held in its inner position whereby the projection 50a engages with the inner recesses 40b2 of the drive plate 40. At higher rotation speeds, the inwardly directed force is less than the centrifugal force and the trigger member 50' is then pressed toward its outer position whereby projection 50a engages with the outer recesses 40b3 of the drive plate 40.

The centrifugal device 50 is thus adapted engage, via said projection 50a on the trigger element 50', at a low rotation speed of a first spring unit 51', with said inner notches or recesses 40b2, and at a high speed, by centrifugal forces, to engage with the outer, circumferentially distributed, notches or recesses or cutouts 40b3.

When said projection 50a assumes a position corresponding to the position of the intermediate groove 40b4 (40b1), the safety mechanism 3a and coupling members 10, 20 of safety coupling 1 resume the initial active position in order to form a starting position "x1" for permitted travel distance "x3" toward position "x2" for relative movement between coupling members 10, 20 upon each subsequent operating cycle A2, A3.14

This displacement is activated and accomplished by means of a centered return spring assembly 45.

Figure 8:
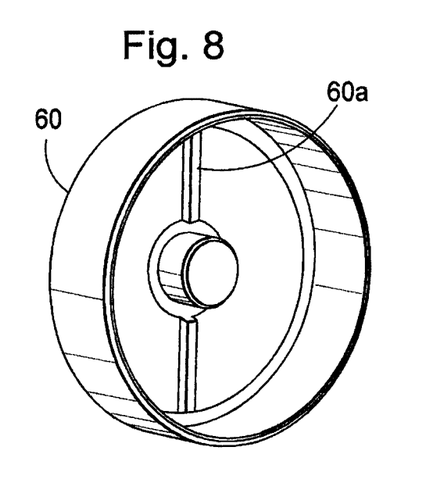
FIG. 8 shows a perspective view of one lateral surface of a safety coupling's triggering disc, intended to allow the two units associated with the centrifugal device to be radially guided via radial ridges, from a proximate connecting position toward the center, via springs within a first spring assembly, to a position located adjacent to the periphery of the effects of the centrifugal force.
Figure 9:
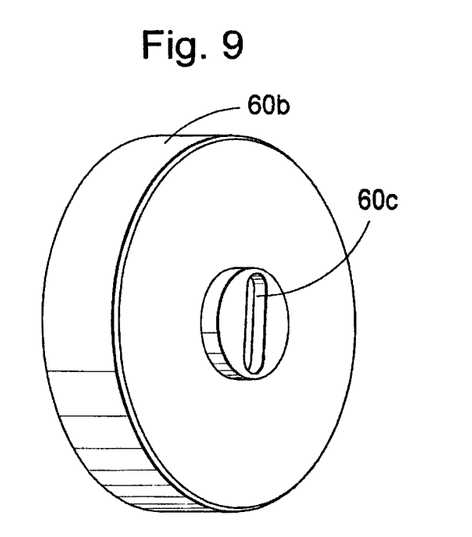
FIG. 9 shows a perspective view of the second lateral side of the safety coupling's triggering disc, which, via a centrally located groove-shaped recess, is adapted to engage with and rotate a triggering switch ring located near the safety coupling in order to expose the coupling unit.

The centrifugal device 50 has two units which are movable by rotary motion in a radial manner from each other, a trigger element 50' and a counterweight element 50", with its projections, a projection 50a for unit 50, and is thereby guided in its radial movement by the radial grooves 50b in cooperation with radial rails 60a in a hub plate 60, according to FIGS. 8 and 9. This disc 60 has a cylindrical rim 60b and an outer groove 60c. This groove should be in a rigid engagement with a projection 41a for the rotation of the disc 41.

Figure 4:
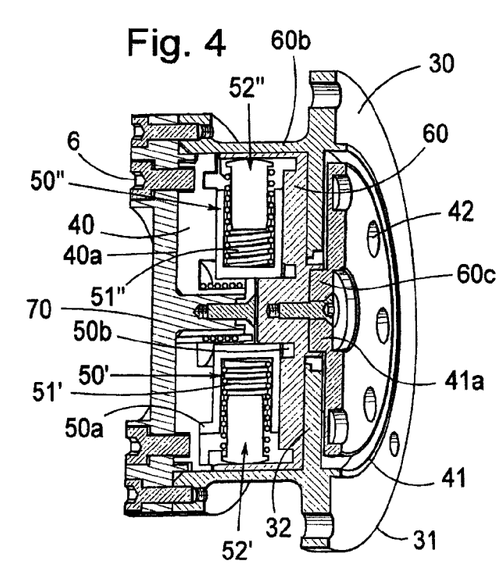
FIG. 4 shows in a perspective side view and in a sectional view an actuatable safety mechanism forming a part of the inside of the safety coupling, according to FIG. 2.
Figure 5:
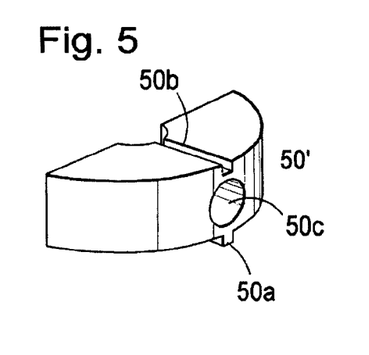
FIG. 5 shows one unit, of two units, forming a part of a centrifugal arrangement, but with a first spring assembly removed for clarification purposes.

The units 50', 50' movable by rotary motion in a radial manner from each other are pressed, by the first and second spring units 51', 51" for the first and second devices 50', 50", to their inner starting position for engagement with notches or recesses 40b2 with projection 50a at low or no rotary motion, according to FIG. 4, while the projection 50a is radially displaced, by centrifugal force and at a high rotation speed, for engagement with notches or recesses 40b3.

Projection 50a on the movably arranged device 50', engages, via the drive plate 40, with the grooves 40b2 or 40b3 to form a switching function for the valve assembly 9, for example by means of a switch ring 41, which is adapted by forced rotation to switch and instantaneously open said valve assembly 9, to evacuate the cavity 8 and bring the coupling members 10, 20 to an inactive releasing position.

Figure 10:
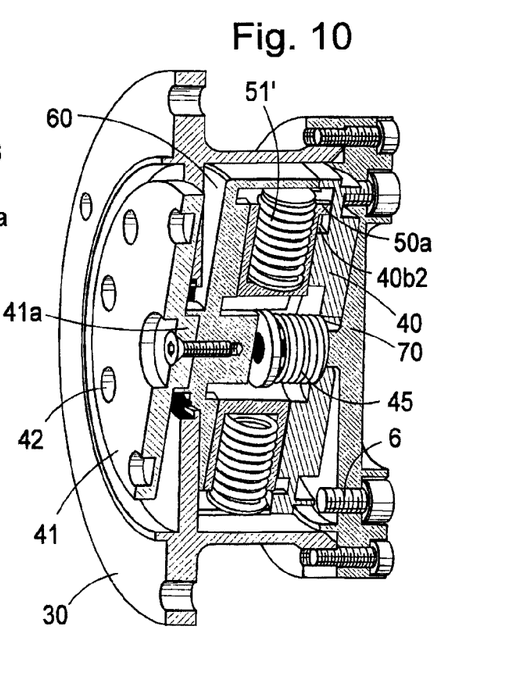
FIG. 10 shows a perspective view of a rotary motion between the safety coupling housing and its contained elements at a high speed and at an applied torque exceeding a predetermined value.
Figure 11:
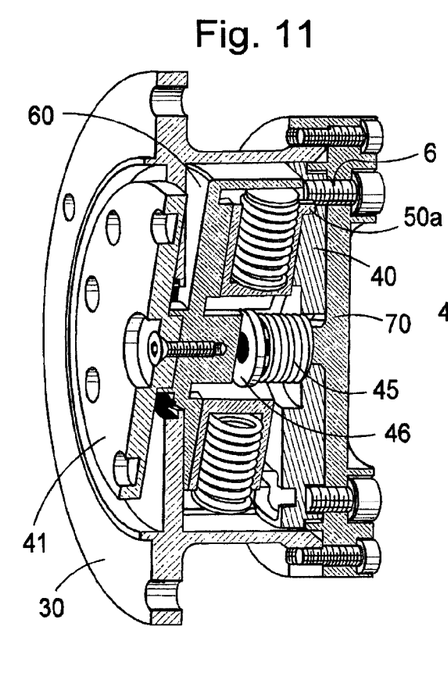
FIG. 11 shows a perspective view of a return of the carrier plate with respect to the housing of the safety coupling.

In operation, the arrangement according the present invention functions in the following manner, as illustrated in FIGS. 10 and 11. When the torque transmitted from the first coupling member 10 to the second coupling member 20 exceeds a predetermined value, coupling members 10, 20 will be displaced relative to each other. This relative movement actuates the safety mechanism 3a through the rotation of switch ring 41, which is connected to the first coupling member 10 by receiving the top 9 of a valve assembly 9' in a peripherally arranged recess 42, relative to housing 30. The housing 30 is retained in position through its inflexible connection with the second coupling member 20. The rotary motion of the switch ring 41 is transferred to the hub plate 60 via interaction between the projection 41a of the switch ring 41 and the groove 60c and the hub plate.

Further, the rotary motion is transferred from the hub plate 60 to the centrifugal device 50 through engagement between the rails 60a and grooves 50b. Depending on the radial position of the triggering element 50', which in turn depends on the rotation speed, the projection 50a engages the inner notches of the drive plate 40b2 or outer notch 40b3. The rotary motion will thus be transmitted to the drive plate 40 which, via the grooves 40a1, 40a2, 40a3 and 40a4 are engaged with the stop screw 6. Upon rotation of drive plate 40, the return spring 45 will be extended from its initial position, creating a biased return force acting on the drive plate 40.

When the rotary motion exceeds the preselected maximized the distance "x3", the stop the screw 6 will come into abutment with the end of the grooves 40a1, 40a2, 40a3 and 40a4, as illustrated by position "x2" in FIG. 7, and prevent further rotation of the drive plate 40 (and the centrifugal device 50, hub plate 60 and the break ring 41) relative to the housing 30. Further applied torque on the first coupling member 10 will therefore cause the top 9' of the valve assembly 9 to be broken or cut by the cutout 42 in the switch ring 41, which opens the valve assembly 9 and evacuates the cavity 8. When the pressure in the cavity 8 is evacuated, the coupling members 10, 20 are brought to an inactive releasing position.

In the event that the rotary motion of the coupling members is below a selected maximized distance "x3", for example 36°, the stop screw 6 will not to come into abutment with the end of the grooves 40a1, 40a2, 40a3 and 40a4 in position "x2". Thus valve assembly 9 remains intact and safety arrangement 3b cannot be triggered.

When the rotation speed is subsequently lowered, the trigger element 50' in the centrifugal device 50 is be pushed back in a radial inward direct by the spring assembly 51' to a position where the projection 50a is no longer engaged with notches 40b2, 40b3 in the drive plate 40, but rather is located in the intermediate groove 40b4. This means that the drive plate 40 is free to rotate relative to the centrifugal device 50. Because drive plate 40 is under the influence of the biasing force of the return spring 45, the drive plate 40 will automatically rotate back to its original position, as illustrated by the position "x1" in FIG. 7, where the stop screw 6 must again run the maximum arcuate distance "x3" to before the safety arrangement is triggered.

The radial position of the projection 50a depends, is as described above, on the rotation speed of the safety coupling 1. At a given speed, there is therefore a risk that the projection 50a will end up and remain in the intermediate groove 40b4 of the drive plate 40, which could lead to a failure of the safety arrangement 3b to be triggered, despite the fact that the rotary motion caused by the torque peaks between the coupling members 10, 20 exceeds the maximum arcuate distance "x3".

Figure 12:
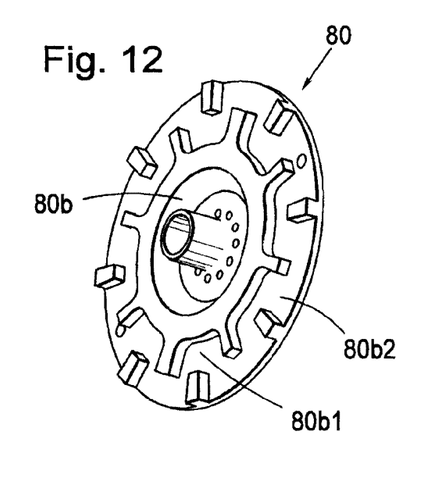
FIG. 12 shows a perspective view of the one circular side of an alternative carrier disc, with circumferentially oriented notches or recesses, wherein a first set of notches or recesses is arranged to face the center of the disc and a second set of notches or recesses is arranged to face the center of the disc and these recesses are tangentially displaced relative to one another.
Figure 13:
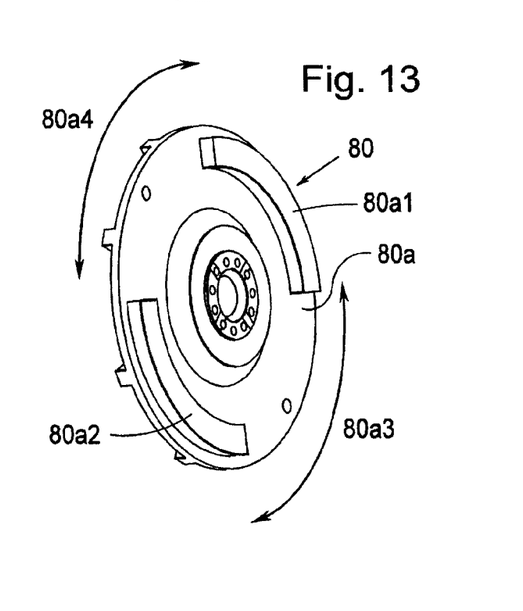
FIG. 13 shows a perspective view of the second circular side of the carrier disc having two circumferentially located ridges connecting to form a single circular line, whose mutual arcuate distance defines a free travel distance within a maximized arcuate distance, corresponding to a maximized yet limited relative movement between the first and the second coupling members before the coupling member is triggered by the actuation of the safety arrangement by the safety mechanism and brought to its inactive (releasing) position.

In an alternative embodiment, illustrated in FIGS. 12 and 13, drive plate 80 comprises on its first side 80a a plurality of circumferentially arranged ridges 80a1, 80a2, connecting in a circular line. The arcuate distance 80a3, 80a4 between the ridges 80a1, 80a2 corresponds to the selected maximum arcuate distance "x3" and in this case, the stop screw 6 is adapted to come into abutment against the ridges 80a1, 80a2 to thereby trigger the safety arrangement 3b. On the other side 80b, the drive plate 80, like drive plate 40, comprises a plurality of peripheral, inner and outer notches or recesses 80b1, 80b2 in a substantially circular arrangement. The difference between drive plate 80 and plate 40 is that inner notches 80b1 are staggered in relation to outer notches 80b2, preferably by one half-step. Furthermore, notches 80b1, 80b2 are arranged such that no intermediate grooves are formed, i.e. the edges that define the notches 80b1, 80b2 substantially overlap in the radial direction so that the projection 50a of trigger element 50' is permitted to not end up in a radial position where it will not engage with a notch 80b1, 80b2.

Upon resetting of the drive plate 80, therefore, projection 50a will follow a zigzag movement in a radial inward and outward direction between notches 80b1, 80b2 during rising and falling rotation speed. Preferably, notches 80b1, 80b2 are formed so that the tangential distribution of two successive inner notches 80b1 or outer notches 80b2 corresponds to the arcuate distance between the ridges 80a1, 80a2, i.e. to the selected maximum arcuate distance "x3".

With reference to FIG. 14, the function of the present invention is illustrated with reference to the guided safety arrangement 3b and the guiding safety mechanism 3a, which is adapted to allow a limited relative movement between the first 10 and second 20 coupling member in safety coupling 1 corresponding to a selected maximized distance "x 3" between their initial active position "x1", and their inactive position "x2", where a first A1, a second A2, and a third A3 operating cycle are illustrated in order to allow, for every operating cycle without a trigger, for the provision of a relative movement less than the maximized limited relative movement "x3" between the first and the second coupling member 10, 20 and for movement to and remaining in the initial position at every successive operating cycle.

Thus, FIG. 14 intends to provide a torque/time diagram to illustrate the temporal (t) distribution of selected and individual sections of more (not shown) continuous transmissions of torque which are below the initial value "x1" and provide no relative movement between the coupling members 10, 20, but whereby each torque transmission, in the form of short torque peaks, which when exceeding value "x1" provide a more or less relative movement, which in the event of a total displacement motion to and past the value "x2" disable the safety coupling 1.17.

FIG. 14 illustrates three different operating cycles A1, A2 and A3, whereby the first A1 illustrates four discrete, time-distributed (t) and short transmissions of torque, whereby a first and a third torque peak cause no relative movement between the coupling members 10, 20 and a corresponding rotation of the disc 40, a second and a fourth torque peak each cause a short relative rotation within the value "x3" which are added to one another to the value "M1", whereupon the first operating cycle A1 concludes, and the value "M1" can then fall via safety mechanism 3a to the value "M0" or the value "x1".

The values for "M" are plotted along the "x"-axis in FIG. 14.

During a second operating cycle A2, one single high peak torque occurs, which causes a relative movement towards and beyond the value "x2" and the safety coupling is triggered at "M2" and the value "x 2".

The valve assembly 9 must be then replaced and the cavity 8 again filled with a medium 8' under pressure, such as an aqueous emulsion and/or oil. During a third cycle A3, three discrete torque transmissions occur as shown, whereby, each of the two causes a small relative displacement "M3" of the coupling members 10, 20 and whereby both relative displacements will be added to each other, before a subsequent cycle (not shown) is activated and the movement displacement returns to the original value "M0" or location "x1".

Figure 2:
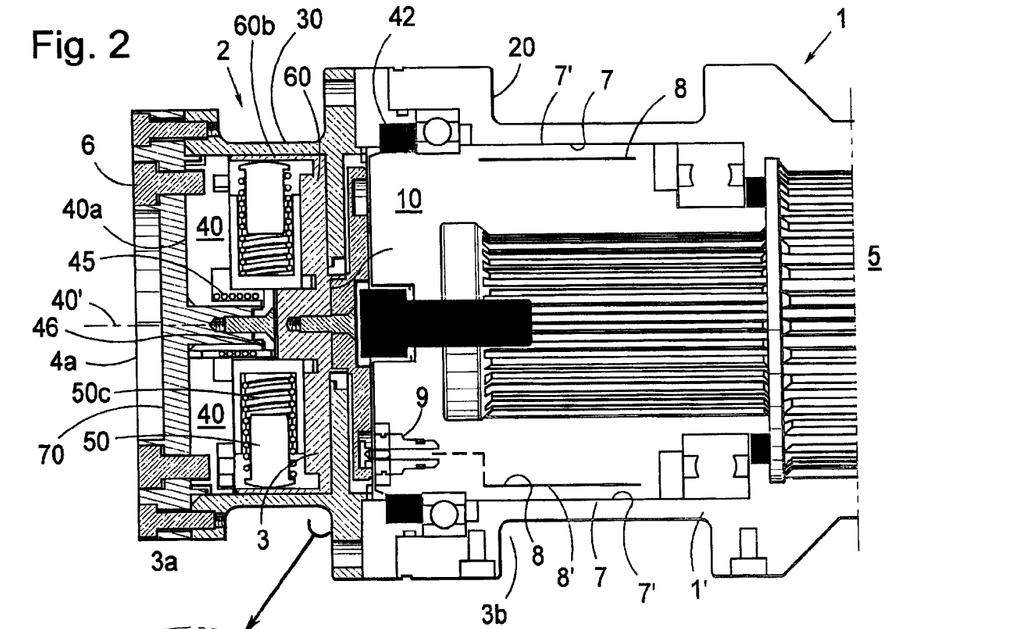
FIG. 2 shows a sectional view and a side view of a coordination of significance for the invention, between a steerable safety arrangement within the safety coupling (right) and a safety mechanism actuatable by the safety arrangement (left)

FIG. 2 uses reference numerals to show the orientation of and interaction between the two discs 40 and 60.

The invention is of course not limited to the above exemplary embodiment, but may undergo modifications within the scope of the invention idea illustrated in the appended claims.

In particular, it should be noted that each illustrated unit and/or circuit may be combined with any other device and/or circuit illustrated within the scope of achieving the desired technical function.

The invention claimed is:

1. A safety coupling comprising a safety mechanism and a safety arrangement related to each other, the safety coupling comprising;
   a coupling unit adapted to, upon rotary movement, permit the transmission of torque between two coaxially oriented coupling members comprising a first, driving, inner coupling member and a second, driven, outer coupling member, with a shaped friction surface located between the inner coupling member and the outer coupling member, wherein the inner coupling member comprises a cavity adjacent to the friction surface which, upon applied pressure, is adapted to expand in the direction of the friction surface;
   wherein the coupling unit is actuatable between a retaining position wherein the cavity is in an expanded position, and a releasing position wherein the cavity is in a non-expanded position;
   wherein the safety arrangement is adapted to, when a preselected torque and a relative motion caused by the preselected torque between the first coupling member and the second coupling member are exceeded, be triggered by the safety mechanism to evacuate a pressure from the cavity to bring the coupling unit from the retaining position to the releasing position;
   wherein the safety arrangement is adapted to instantaneously bring the coupling unit to the releasing position,
   wherein the safety mechanism is adapted to allow a limited relative movement between the first coupling member and the second coupling member, corresponding to a selected maximum arcuate distance between an initial active position and a final inactive position of the safety mechanism, without triggering the safety arrangement, and
   wherein means allocated to the safety mechanism are adapted to, upon a final operating cycle of the safety coupling, return and/or displace the safety mechanism in the direction of the initial active position, in order to provide again from the initial active position the limited relative movement between the first coupling member and the second coupling member during a subsequent operating cycle;
   wherein the limited relative movement between the first and second coupling members is below a few revolutions; and
   wherein the cavity interacts with a valve assembly adapted to be opened instantaneously by a cutting operation, activated by the rotation of an adjacent first disc.

2. The safety coupling according to claim 1, wherein the initial active position is selected to fall within a maximum arcuate distance where the safety mechanism can be displaced between the initial active position and the inactive position and in opposite directions from the initial active position, depending on the selected direction of rotation of the two coupling members.

3. The safety coupling according to claim 1, wherein the limited relative movement between the first and second coupling members is below a single revolution.

4. The safety coupling according to claim 3, wherein the limited relative movement between the first and second coupling members is at least below a fraction of a revolution.

5. The safety coupling according to claim 1, wherein relative movement between the coupling members beyond a selected predetermined maximum arcuate distance brings the safety mechanism to the final inactive position.

6. The safety coupling according to claim 1, wherein the means adapted to return and/or displace the safety mechanism comprise the first disc which along a first side is formed with one or a plurality of circumferential grooves or ridges, connecting to form a single circular line, wherein the length of the grooves or the arcuate distance between the ridges is adapted to correspond to the selected maximum arcuate distance between the initial active position and the final inactive position of the safety mechanism and wherein a stop means is adapted to interact with the grooves or ridges in order to trigger the safety arrangement.

7. The safety coupling according to claim 6, wherein the first disc along a second side, which is directed away from the first side, comprises a plurality of inner notches facing toward the center of the first disc and a plurality of circumferentially facing outer notches.

8. The safety coupling according to claim 7, wherein the inner notches and the outer notches are adaptably engageable with one or more units having projections arranged in a radially movable manner via a centrifugal device acting on centrifugal forces.

9. The safety coupling according to claim 8, wherein the centrifugal device is adapted to, at a low rotation speed, engage with the inner notches and at a high rotation speed, engage with the outer notches.

10. The safety coupling according to claim 9, wherein the inner notches and outer notches of the first disc are adapted to open to an intermediate substantially circular groove, and when the units with the projections assume a radial position corresponding to the position of the intermediate groove, the safety mechanism resumes the initial active position.

11. The safety coupling according to claim 9, wherein the inner notches and outer notches of the first disc are arranged tangentially displaced one half-step in relation to each other.

12. The safety coupling according to claim 8, wherein the centrifugal device comprises units which are movable by rotary motion in a radial manner from each other with allocated projections and are guided by one or more radial grooves interacting with one or more radial rails on a second disc.

13. The safety coupling according to claim 12, wherein the units are pressed into inner starting positions by first and second spring units, respectively, at a low rotary motion or at no rotary motion.

14. The safety coupling according to claim 12, wherein the projections on the movably arranged units are engageable with the first disc to engage with the stop means, which is adapted to open the valve assembly by forced rotation and bring the coupling members to the releasing position.

15. The safety coupling according to claim 6, wherein the stop means comprises a screw or bolt.

16. The safety coupling according to claim 1, wherein the means adapted to return and/or displace the safety mechanism comprises a drive plate and a return spring.

* * * * *